(12) United States Patent
Braithwaite (10) Patent No.: US 9,521,854 B2
(45) Date of Patent: Dec. 20, 2016

(54) METHOD AND DEVICE FOR CREATING FROZEN PELLETS OF A FOODSTUFF

(75) Inventor: David C. Braithwaite, Palos Heights, IL (US)

(73) Assignee: Air Liquide Industrial U.S. LP, Houston, TX (US)

( * ) Notice: Subject to any disclaimer, the term of this patent is extended or adjusted under 35 U.S.C. 154(b) by 2002 days.

(21) Appl. No.: 11/681,084

(22) Filed: Mar. 1, 2007

(65) Prior Publication Data

US 2007/0281067 A1 Dec. 6, 2007

Related U.S. Application Data

(60) Provisional application No. 60/809,902, filed on May 31, 2006, provisional application No. 60/810,321, filed on Jun. 2, 2006.

(51) Int. Cl.
*A23G 9/00* (2006.01)
*A23G 9/22* (2006.01)
*A23G 9/44* (2006.01)
*A23G 9/06* (2006.01)

(52) U.S. Cl.
CPC . *A23G 9/22* (2013.01); *A23G 9/06* (2013.01); *A23G 9/44* (2013.01)

(58) Field of Classification Search
CPC .............. A23G 9/22; A23G 9/06; A23G 9/44
USPC ........................ 426/384, 656; 99/455; 222/71
See application file for complete search history.

(56) References Cited

U.S. PATENT DOCUMENTS

| 2,313,894 | A | * | 3/1943 | Sanna et al. ............... 222/372 |
| 3,556,808 | A | * | 1/1971 | Panek ............... A22C 17/0053 426/281 |
| 3,829,242 | A | * | 8/1974 | Duke et al. .................. 417/38 |
| 5,126,156 | A | | 6/1992 | Jones |
| 5,464,120 | A | * | 11/1995 | Alpers et al. ................. 222/1 |
| 5,517,904 | A | | 5/1996 | Vargas et al. |
| 5,664,422 | A | | 9/1997 | Jones |
| RE36,178 | E | | 4/1999 | Freudinger et al. |
| 6,216,470 | B1 | | 4/2001 | Kosock et al. |
| 6,325,016 | B1 | | 12/2001 | Fitch, Jr. et al. |

OTHER PUBLICATIONS

Pizzamatic Description/Specification for MODEL 2400A-213/x Multilane Sauce Depositor, MODEL 2400 ILS Pizza Sauce Applicator and MODEL 2400A Pizza Sauce Applicator, available at http://www.pizzamatic.com/products, copy printed Jun. 1, 2006.

* cited by examiner

*Primary Examiner* — Katherine D Leblanc
(74) *Attorney, Agent, or Firm* — Christopher J. Cronin (57) ABSTRACT

In one embodiment, a method of forming frozen ice cream pellets includes supplying an ice cream premix into a loading vessel; loading a loading cylinder with the ice cream premix from the loading vessel, the loading cylinder being connected to the loading vessel; applying a machine-controllable force to expel the ice cream premix from the loading cylinder as ice cream premix pellets; and exposing the ice cream premix pellets to a cryogenic fluid, thereby at least partially freezing the ice cream premix pellets.

8 Claims, 6 Drawing Sheets

METHOD AND DEVICE FOR CREATING FROZEN PELLETS OF A FOODSTUFF

CROSS-REFERENCE TO RELATED APPLICATIONS

This application claims the benefit under 35 U.S.C. §119 (e) to U.S. Provisional Application No. 60/809,902, filed May 31, 2006 and to U.S. Provisional Application No. 60/810,321, filed Jun. 2, 2006. The entire contents of each aforementioned application are incorporated herein by reference.

BACKGROUND

Sales of frozen foodstuff have risen dramatically in recent years. In particular, ice cream and yogurt product in the form of pellets have become very popular.

One method of forming the pellets involves delivering flavored liquid dairy composition to a feed tray and then dripping the composition into a freezing chamber. The feed tray includes a sieve plate having orifices formed therein. The liquid dairy composition passes through the sieve plate and forms pellets that fall into the freezing chamber. The falling pellets of liquid compositions freeze rapidly in the freezing chamber, thereby forming solid pellets of flavored ice cream or yogurt product. The frozen pellets are removed from the freezing chamber and packed for distribution and later consumption.

One problem encountered with the drip system is the production of pellets having different sizes. The non-uniform sized pellets detract from the appearance of the product. Additionally, the drip system also causes the pellets to drip at different times, thereby causing poor "belt loading." Poor belt loading occurs when an insufficient quantity of pellets land in the cooling medium at any one time. Poor belt loading results in an inefficient use of the cooling medium, because more cooling medium will be required to freeze the same quantity of pellets.

There is, therefore, a need for methods and apparatus for the production of pellets for frozen foodstuff. There is also a need for methods and apparatus for producing frozen food pellets of uniform size.

SUMMARY

Embodiments of the present invention relate to methods and apparatus for producing frozen pellets of a foodstuff, in particular, pellets of an ice cream premix. In one embodiment, an injector apparatus is adapted to release pellets of the ice cream premix into a cooling medium.

In one embodiment, a method of forming a frozen foodstuff pellet includes supplying a foodstuff premix into a loading vessel; loading a loading cylinder with the foodstuff premix from the loading vessel, the loading cylinder being connected to the loading vessel; applying a force to expel the foodstuff premix from the loading cylinder; and exposing the foodstuff premix to a cryogenic fluid, thereby at least partially freezing the foodstuff premix.

In another embodiment, a method of forming frozen ice cream pellets includes supplying an ice cream premix into a loading vessel; loading a loading cylinder with the ice cream premix from the loading vessel, the loading cylinder being connected to the loading vessel; applying a machine-controllable force to expel the ice cream premix from the loading cylinder as ice cream premix pellets; and exposing the ice cream premix pellets to a cryogenic fluid, thereby at least partially freezing the ice cream premix pellets. In another embodiment, applying the machine-controllable force comprises injecting pressurized air into the loading vessel. In yet another embodiment, applying the machine-controllable force comprises injecting ice cream premix under pressure into the loading vessel.

In another embodiment, a method of forming frozen ice cream pellets includes operating a reciprocating piston to supply ice cream premix into a loading vessel; depositing the ice cream premix from the loading vessel into a transport apparatus containing a cooling medium; and at least partially freezing the ice cream premix into pellets while transporting the ice cream away from the loading vessel.

In yet another embodiment, an apparatus for forming frozen ice cream pellets includes an injector apparatus for depositing ice cream pellets and a cooling medium for at least partially freezing the ice cream pellets. In one embodiment, the injector apparatus may include a loading vessel and a reciprocating piston apparatus for supplying ice cream premix to the loading vessel. In another embodiment, the injector apparatus may include a loading vessel; a loading cylinder connected to a lower portion of the loading vessel and configured to deposit the ice cream pellets; and a pressurized source connected to the loading vessel for supplying fluid pressure to the loading vessel.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Embodiments of the present invention relate to methods and apparatus for producing frozen pellets of a foodstuff, in particular, pellets of an ice cream premix. In one embodiment, an injector apparatus is adapted to release pellets of the ice cream premix into a cooling medium.

Figure 1:
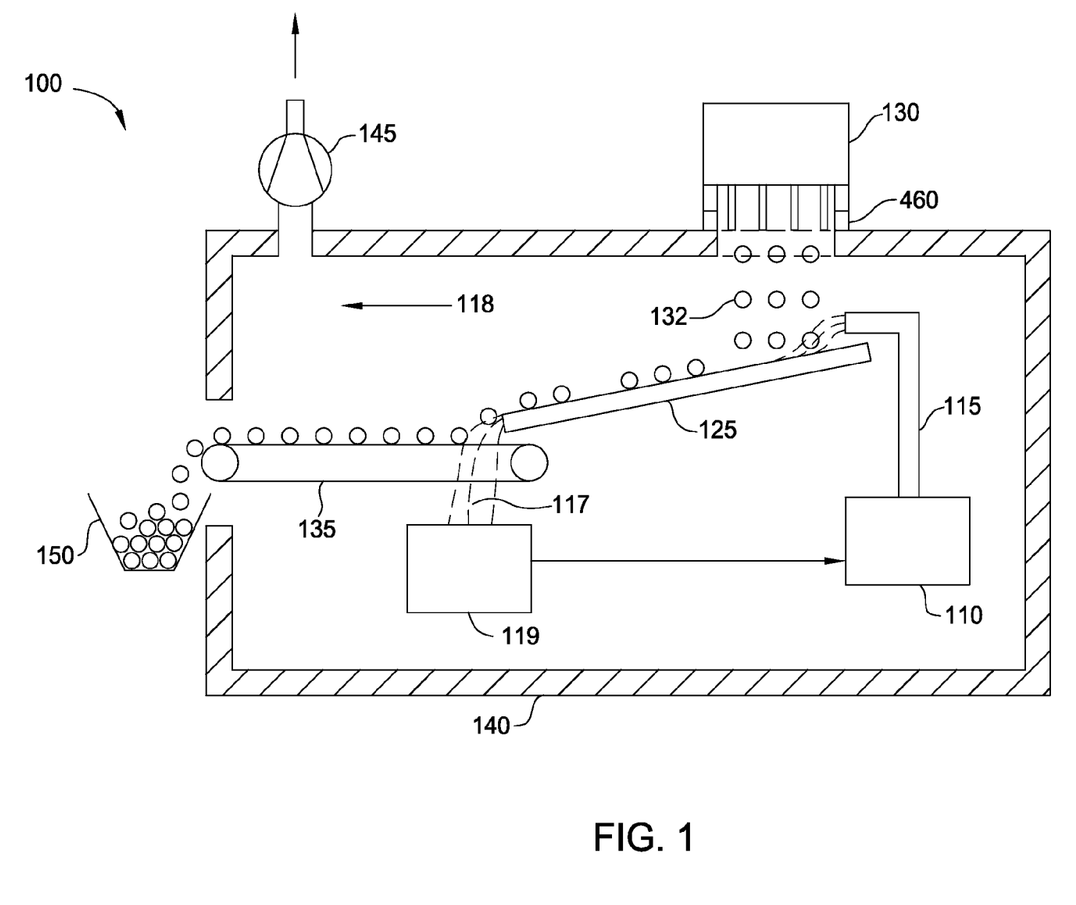
FIG. 1 illustrates an embodiment of a pelletizer assembly for producing frozen pellets of foodstuff.

FIG. 1 shows a pelletizer assembly 100 according to one embodiment of the present invention. The assembly 100 includes a storage tank 110 for a cooling medium 117, preferably liquid nitrogen, and a pump 115 for pumping the cooling medium 117 to a trough 125. The trough 125 may be horizontally positioned at a downward angle such that the cooling medium 117 may flow down toward a conveyor belt 135. An outlet of an injector apparatus 130 is located above the upper end of the trough 125 for delivering foodstuff pellets 132 into the trough 125 and the cooling medium 117. The length of the trough 125 is dimensioned such that sufficient time is provided for the cooling medium 117 to at least freeze the outer surface of the pellets 132. Thus, the core of the pellets 132 may still be liquid when the pellets 132 reach the end of the trough 125. The conveyor belt 135 is located below the trough 125 to collect the at least partially frozen pellets 132. The conveyor belt 135 is adapted to collect the pellets 132 on the conveyor belt 135 but allow the cooling medium 117 to pass through. An exemplary material for the conveyor belt 135 is a metal screen. The cooling medium 117 is collected by a fluid collection apparatus 119 and returned to the storage tank 110. In another embodiment, the length of the trough 125 may be selected to ensure that the pellets 132 are completely frozen by the time the pellets 132 reach the end of the trough 125. In another embodiment, the cooling medium may be any suitable cryogenic fluid known to a person of ordinary skill in the art.

The pellet freezing process in the trough 125 vaporizes some of the cooling medium 117 to produce a vaporized cooling medium 118. The trough 125 and the conveyor belt 135 may be encased by a heat-insulating casing 140 in such a way that the vaporized cooling medium 118 are drawn off above the conveyor belt 135 in parallel flow with the transport direction of the pellets 132. In one embodiment, the vaporized cooling medium 118 is drawn off by an exhaust-gas fan 145 installed above the end of the conveyor belt 135. In this respect, the direction of flow of the gaseous cooling medium 118 corresponds to the transport direction of the pellets 132 on the conveyor belt 135. Thus, the flow of gaseous cooling medium 118 may continue to remove energy from the pellets 132 during transport on the conveyor belt 135. The length and speed of the conveyor belt 135 and the flow conditions of the vaporized cooling medium 118 may be selected in such a way that the pellets 132 are completely frozen by the time it reaches the end of the conveyor belt 135. The frozen pellets 132 are collected in the container 150.

Figure 2:
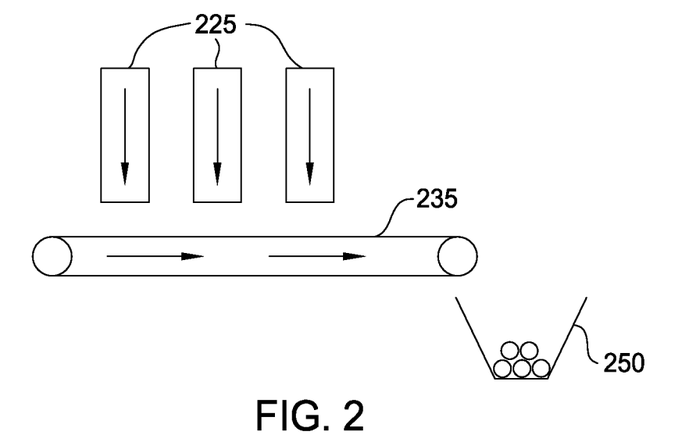
FIG. 2 illustrates another embodiment of a pelletizer assembly.
Figure 3:
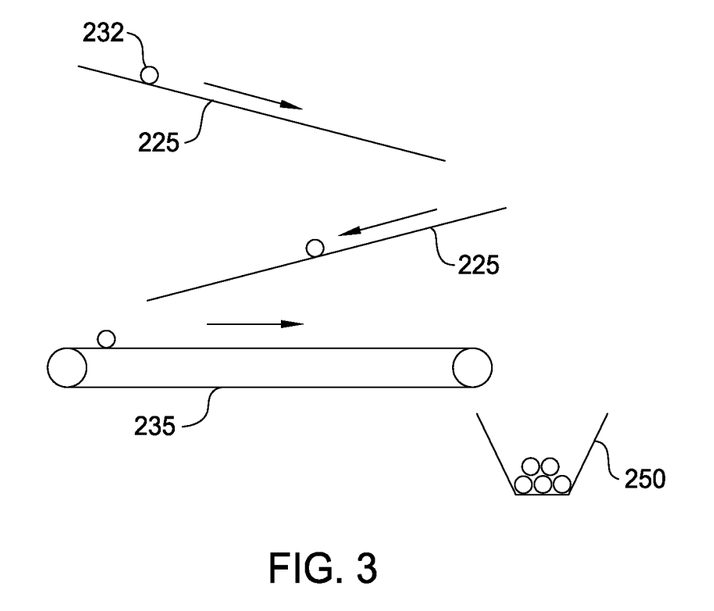
FIG. 3 illustrates another embodiment of a pelletizer assembly.

In another embodiment, the conveyor belt 135 may be arranged in line with, in the opposite direction of, or crosswise the direction of the trough 125. In one arrangement, the trough 125 may be divided into a plurality of shorter troughs 225 on which the cooling medium flow and pellets 232 may flow forwards and backwards, as shown in FIG. 2. The divided trough 225 is beneficial for a space-saving type of construction. In a crosswise arrangement, a plurality of troughs 225 may feed directly to one conveyor belt 235 as illustrated in FIG. 3.

Figure 4:
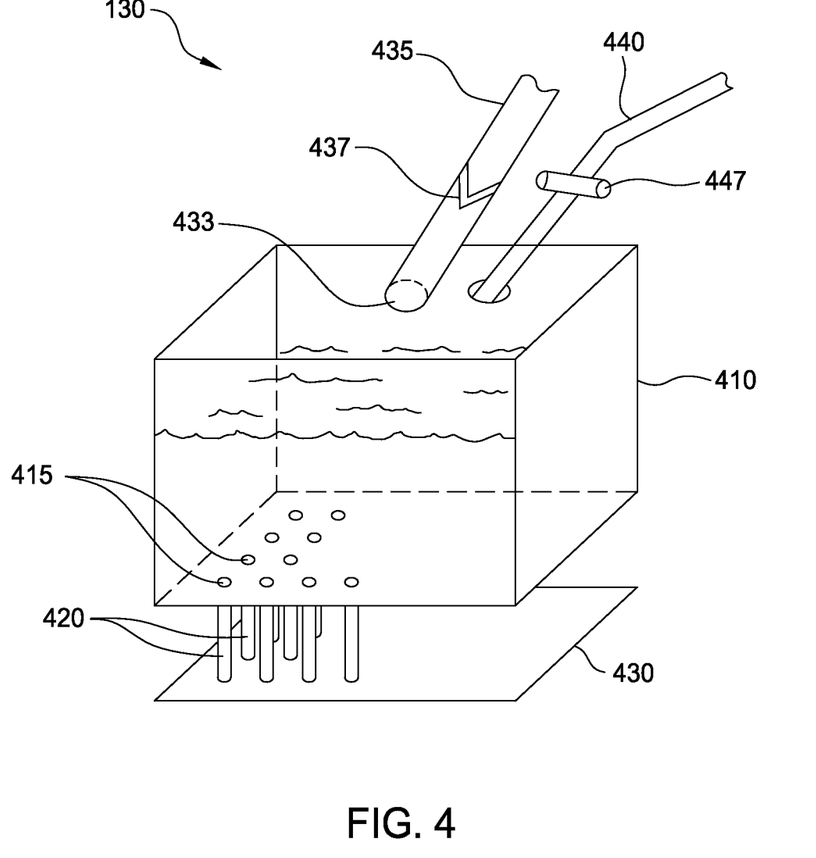
FIG. 4 illustrates an embodiment of an injector apparatus for use with a pelletizer assembly.

FIG. 4 shows an embodiment of an injector apparatus 130 suitable for use with the pelletizer assembly 100. The injector apparatus 130 includes a loading vessel 410 having a bottom wall with multiple holes 415 in fluid communication with a respective loading cylinder 420. In the embodiment shown in FIG. 4, the injector apparatus 130 includes a large rectangular loading vessel 410 having dimensions of at least about 30" L×6" W×18" H. The bottom wall of the loading vessel 410 has multiple, uniformly aligned holes 415 that are positioned as closely as possible in proximity to each other. In one embodiment, each hole 415 is approximately 0.5" in diameter. It must be noted that the holes 415 may be positioned in any suitable manner, for example, evenly spaced apart, random, aligned diagonally, vertically, or horizontally, or combinations thereof.

Figure 4A:
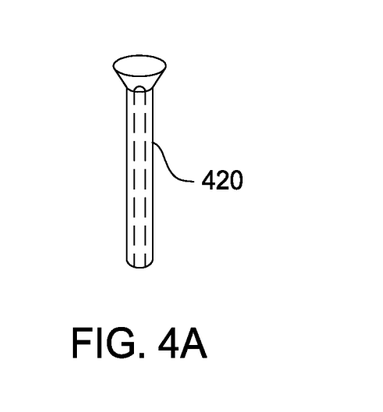
FIG. 4A illustrates an exploded view of a loading cylinder.

Each hole 415 may be fitted with a small diameter loading cylinder 420. In one embodiment, the loading cylinders 420 are positioned above an opening in the pelletizer 100 such that the pellets 132 expelled from the loading cylinders 420 may land in the cooling medium 117 flowing in the trough 125. Referring to FIG. 4A, the loading cylinder 420 may have an enlarged, beveled opening at the top to facilitate connection to the respective hole 415 in the loading vessel 410. Exemplary forms of the loading cylinder 420 include a short nozzle, a long tube, or any form suitable for delivering the pellets 132. The diameter of the loading cylinder 420 may be sized to prevent the ice cream premix to drip from the loading cylinder 420 due to gravity alone. In one embodiment, the loading cylinder 420 is sized between about 2-5 mm ID and about 50-150 mm long. In another embodiment, the loading cylinder 420 may be sized between about 1-10 mm ID and about 10-250 mm long. A stabilizing support plate 430 may be connected to the lower end of the cylinders 420 to stabilize and maintain the alignment of the loading cylinders 420 with respect to the loading vessel 410.

A hole 433 may be provided at the top of the loading vessel 410 to allow ice cream premix to be pumped into the loading vessel 410. A loading tube 435 may be connected to the hole 433 to supply the ice cream premix to the loading vessel 410. In one embodiment, the tube 435 supplies the ice cream premix in an airtight manner. A check valve 437 (or other forms of one way valve) may be installed on the loading tube 435 to prevent the ice cream premix to flow backwards. The ice cream premix may be pumped from flavor tanks or other premix storage vessels into the rectangular loading vessel 410. In one embodiment, the ice cream premix is maintained at a level between about 15% to 95%; preferably, about 50% to 80%, of the loading vessel 410. In another embodiment, the ice cream premix is maintained at a level sufficient to maintain a proper head pressure above the loading cylinder 420 such that the desired size of pellets 132 is ejected.

High pressure air, nitrogen, carbon dioxide vapor, or other compressed gas may be supplied into the headspace above the ice cream premix in the loading vessel 410. As shown in FIG. 4, a compressed gas line 440 is connected to the loading cylinder 410 to supply gas as needed. The flow of compressed gas may be controlled through the use of a timer-operated on/off solenoid valve 447.

In operation, the ice cream premix is supplied into the loading vessel 410 using the loading tube 435. The premix may flow into the top portion of each loading cylinder 420 and may partially flow down the loading cylinder 420. The viscosity of the premix, coupled with the length and the restricted inner diameter of the cylinder 420, may restrict the ability of the premix to flow smoothly through the cylinder 420, thereby blocking the cylinder 420 with the liquid premix. At this point, each cylinder 420 is considered "loaded". The premix may continue to be supplied until a predetermined level of premix in the loading vessel 410 is reached.

The compressed gas may then be injected into the empty headspace of the loading vessel 410. The increase in pressure in vessel 410 forces some of the premix down and out of the cylinder 420, thereby depositing a volume of premix pellets 132 into the liquid nitrogen stream 117 and trough 125 below. The desired size of premix pellets 132 to be deposited may be controlled by managing the quantity of compressed air injected into the loading vessel 410. The next batch of pellets 132 may be deposited as soon as the previous batch clears the path of the loading cylinders 420. In this manner, the pellets 132 may be deposited into the liquid nitrogen 117 in the same accurate pattern and volume with each actuation of the compressed gas.

The continuous stream of liquid nitrogen 117 carries away the deposited premix pellets 132. The liquid nitrogen 117 at least partially freezes the pellets 132. The trough 125 delivers the pellets 132 and the liquid nitrogen 117 to the conveyor belt 135, where the separated pellets are retained, while the liquid nitrogen 117 is recycled back to the storage tank 110. On the conveyor belt 135, the pellets 132 continue to solidify until it is completely frozen. At the end of the conveyor belt 135, the frozen pellets 132 are collected in the container 150. In this manner, an almost seamless, continuous flow of ice cream premix pellets 132 may be applied in a very tight pattern without danger of excessive mating or freezing together.

In another embodiment, the injector apparatus 130 may positioned on a load cell 460 or other suitable load measuring device, as shown in FIG. 1. The load cell 460 may be adapted to measure the load on the injector apparatus 130 which is correlated to the level of premix in the loading vessel 410. As the premix is forced out of the rectangular loading vessel 410, the load cells 460 supporting the loading vessel 410 may monitor volume of premix remaining in the loading vessel 410. When the level of the premix reaches a preset lower limit, the premix pump may be activated to load premix into the loading vessel 410 through the loading tube 435. The premix loading may continue until the load cells 460 register a preset upper limit. This cycle may be repeated to maintain the premix volume in a steady range. The steady premix range provides a constant head pressure on the loading cylinders 120, thereby assuring accurate deposition of the pellets 132. In another embodiment, the injector apparatus may be equipped with a sensor to measure the height of the premix in the loading vessel 410. The quantity of premix may be controlled based on the level of the premix measured by the sensor.

Advantages of one embodiment of this system include dramatically improved coverage of ice cream premix pellets in the liquid nitrogen, substantially increased production rates, highly consistent pellet size, ability to vary pellet size through pressure, duration of compressed gas cycle, and reduced incidence of product mating.

Figure 5:
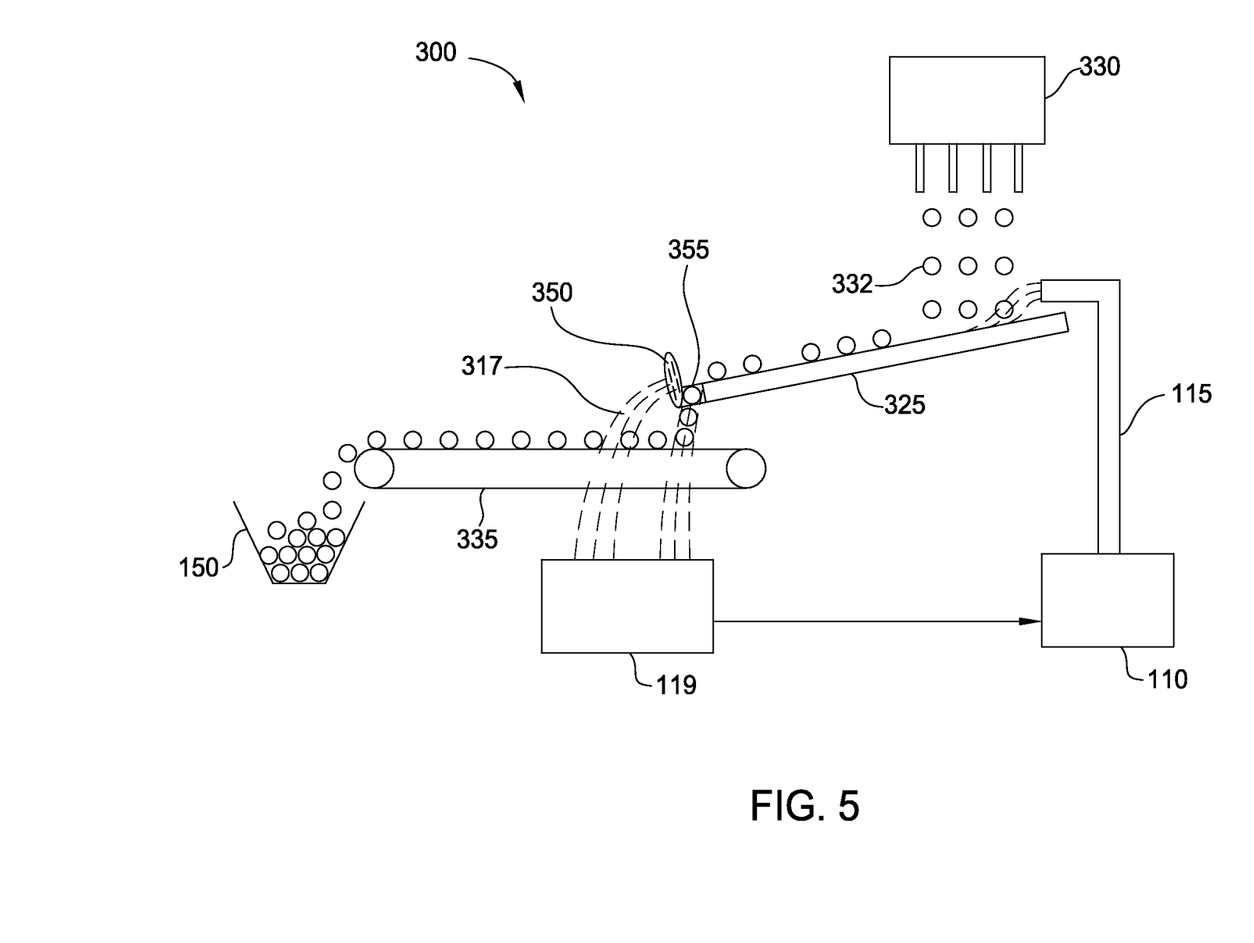
FIG. 5 illustrates another embodiment of a pelletizer assembly.

FIG. 5 illustrates a side view of another embodiment of a pelletizer assembly 300. As shown, the trough 325 is provided with a barrier 350 disposed at the downstream end and an opening 355 for the pellets 332 to leave the trough 325. In one embodiment, the barrier 350 is configured to retain the pellets 332, but allow the cooling medium 317 to pass. Exemplary barriers include a metal or non-metal structure having a plurality of apertures or perforations such as a metal screen, a multilayer screen, and any other suitable porous structure. The opening 355 may be a slot or other apertures formed on the trough 325 and/or between the trough 325 and the barrier 350 and sufficiently sized for the pellets 332 to pass. In use, the injector apparatus 330 deposits the pellets 332 in the trough 325, where they are cooled by the cooling medium 317. The cooling medium 317 carries the pellets 332 toward the end of the trough 325 where the pellets 332 fall through the opening 355 and land on the conveyor belt 335 or other collection apparatus. The barrier 350 retains the pellets 332 in the trough 325 until they fall through the opening 355. A portion of the cooling medium 317 passes through the opening 355 along with the pellets 332, while the remaining portion continues through the barrier 350 and falls on the conveyor belt 335 at a point downstream of the opening 355. In this respect, the cooling medium 317 cascades on top of the pellets 332 that have accumulated on the conveyor belt 335. As a result, the at least partially frozen pellets 332 may receive another exposure to the cooling medium 317 while being carried by the conveyor belt 335 toward the collection container 150. The additional exposure of the pellets 332 to the cooling medium 317 effectively increases the freezing capacity of the assembly 300. In another embodiment, the barrier 350 may be a solid wall such that all of the cooling medium 317 and pellets 332 are forced through the opening 355.

Figure 6:
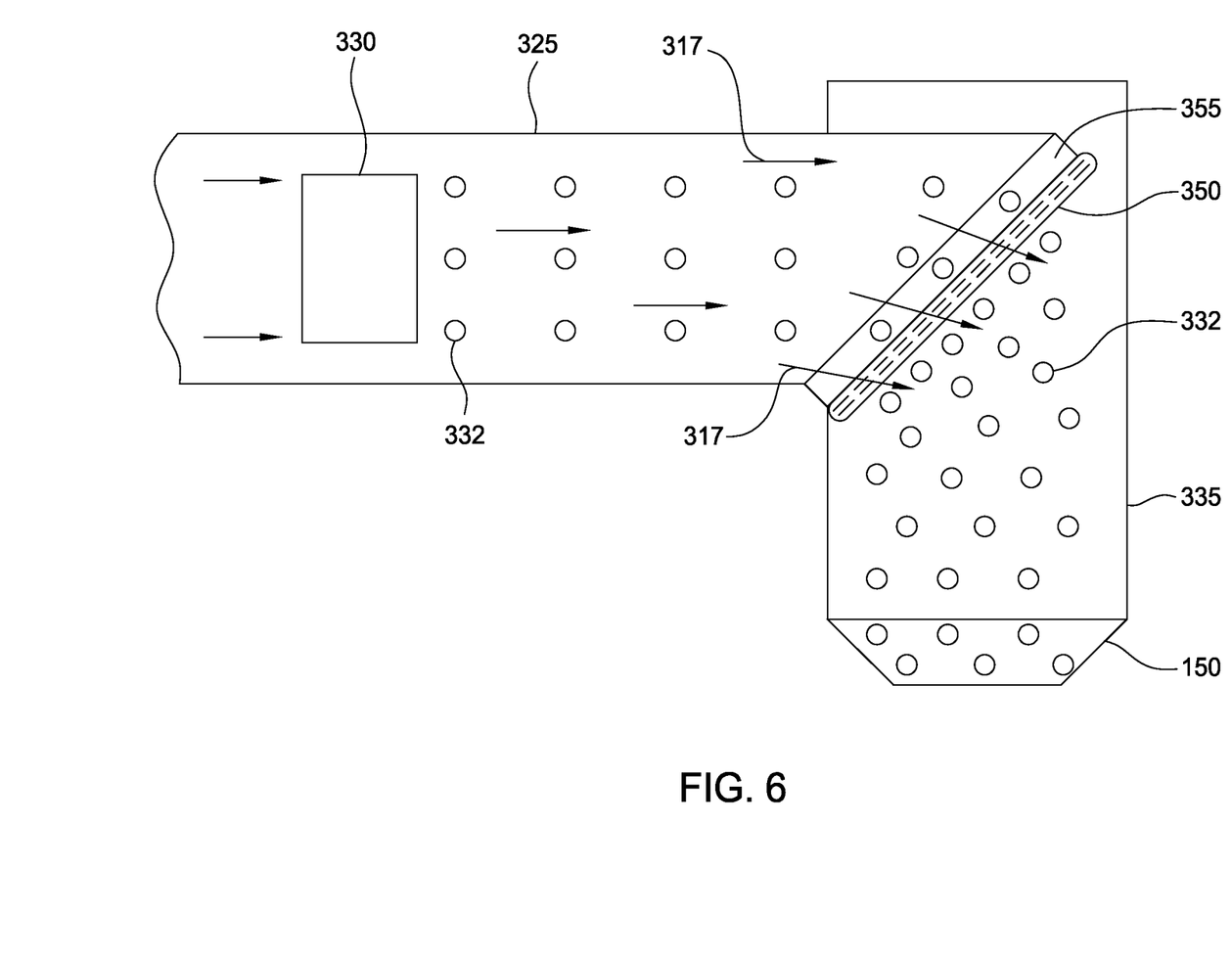
FIG. 6 illustrates another embodiment of a pelletizer assembly.

FIG. 6 illustrates a top view of another embodiment of a pelletizer assembly 300. The pelletizer assembly 300 includes a trough 325 having a pellet barrier 350. As shown, the end of the trough 325 is angled relative to the direction of travel of the pellets 332. In one embodiment, the end of the trough 325 is angled between about 30 degrees and 60 degrees, more preferably, between about 40 degrees and 50 degrees. The conveyor belt 335 is positioned at about a right angle relative to the trough 325 to collect the pellets 332 exiting the opening 355. However, it is contemplated that the trough end may have any suitable angle, and the conveyor belt may be positioned at any angle capable of collecting the pellets. In use, the injector apparatus 330 deposits the pellets 332 in the trough 325, where they are cooled and carried away by the cooling medium 317. At the end of the trough 325, the pellets 332 drop through the opening 355 and land on the conveyor belt 335 or other collection apparatus. The barrier 350 stops the pellets 332 in the trough 325 until they fall through the opening 355. The angled end of the trough 325 allows the pellets 332 that fall through the opening 355 to spread across the width of the conveyor belt 335. Some of the cooling medium 317 flows through the barrier 350 and drenches the pellets 332 accumulated on the conveyor belt 335. As a result, the at least partially frozen pellets 332 may receive another exposure to the cooling medium 317 while being carried by the conveyor belt 335 toward the collection container 150.

Figure 7:
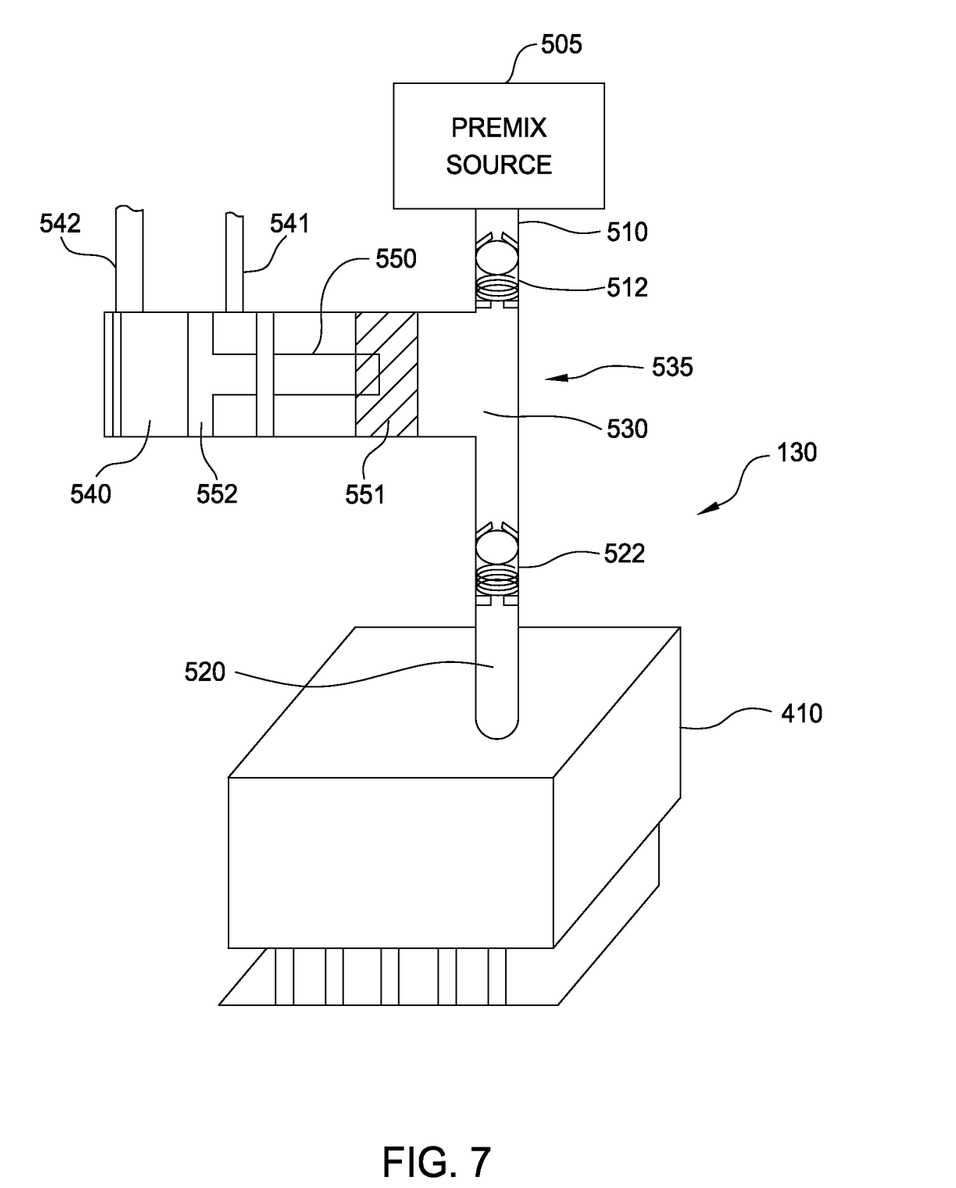
FIG. 7 illustrates an embodiment of a pump controlled depositing apparatus.

In another embodiment, the injector apparatus 130 may utilize a pump controlled depositing apparatus 535 to deposit the pellets 132 into the liquid nitrogen 117. In FIG. 7, the injector apparatus 130 in shown with a pump controlled depositing apparatus 535 for delivering ice cream premix to the loading vessel 410 and depositing pellets 132 into the liquid nitrogen 117. As shown, the depositing apparatus 535 has an inlet end 510 connected to the premix source 505 and an outlet end 520 connected to the loading vessel 410. A one way valve 512 is positioned at each end to control the flow of the premix. A loading chamber 530 is formed between the two valves 512, 522. The inlet valve 512 at the inlet end 510 allows premix to enter the loading chamber 530, but not leave. The outlet valve 522 at the outlet end 520 allows the premix to leave the loading chamber 530, but not enter. In one embodiment, each valve 512, 522 is a ball valve having a ball biased by a biasing member such as a spring. It is contemplated that other suitable one way valves may be used.

The reciprocating piston pump apparatus 535 is used to draw the premix into the loading chamber 530 and force the premix into the loading vessel 410. In one embodiment, the piston pump 535 includes a fluid operated reciprocating piston 550 cooperating with a fluid cylinder 540. The piston 550 includes a head 551 that forms a wall of the loading chamber 530, whereby reciprocation of the head 551 changes the volume of the loading chamber 530. The piston 550 also includes a tail 552 located in the fluid cylinder 540. The injection of fluid in front of or behind the tail 552 causes the axial of the movement of the piston 551. Fluid may injected into the fluid cylinder 552 via one of two fluid ports 541, 542 located at each end of the cylinder 540. In another embodiment, piston may be reciprocated by an electric motor.

In operation, the loading vessel 410 is initially full charged with the ice cream premix. Pressurized gas is supplied through the first port 541 in front of the tail 552 to cause the piston to move to the left, thereby increasing the volume of the loading chamber 530. The loading chamber expansion causes the ice cream premix to be drawn through the inlet valve 512 to fill the loading chamber 530. The ice cream premix in the loading vessel 410 cannot come back through the outlet valve 522 due to the one-way nature of the valve 522. Thereafter, pressurized gas is supplied through the second port 542 behind the tail 552 of the piston 550 to cause the piston 550 to move toward the loading chamber 530, thereby decreasing the volume of the loading chamber 530. This reduction in volume forces the premix to exit the loading chamber 530 through the outlet valve 522. The ice cream premix is not forced back into the premix source 505 due to the one way nature of the inlet valve 512. Because the loading vessel 410 was fully charged, the newly injected premix displaces premix pellets 132 out from the bottom of the loading cylinder 420 and into the liquid nitrogen. The cycle may be repeated to deposit more ice cream premix pellets into the liquid nitrogen.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method of forming frozen ice cream pellets, comprising:
    supplying unfrozen ice cream premix into a loading vessel;
    loading a loading cylinder with the ice cream premix from the loading vessel, the loading cylinder being connected to the loading vessel; and
    applying a machine-controllable force to expel the ice cream premix from the loading cylinder that falls into a flow of liquid nitrogen in a trough to at least partially freeze the ice cream premix into pellets, the at least partially frozen ice cream premix pellets being carried away by the liquid nitrogen flow in the trough, wherein applying the machine-controllable force comprises injecting pressurized air into the loading vessel.

2. The method of claim 1, further comprising separating the ice cream premix pellets from the liquid nitrogen.

3. The method of claim 2, further comprising completely freezing the ice cream premix.

4. A method of forming frozen ice cream pellets, comprising:
    supplying unfrozen ice cream premix into a loading vessel;
    loading a loading cylinder with the ice cream premix from the loading vessel, the loading cylinder being connected to the loading vessel;
    applying a machine-controllable force to expel the ice cream premix from the loading cylinder that falls into a flow of liquid nitrogen in a trough to at least partially freeze the ice cream premix into pellets, the at least partially frozen ice cream premix pellets being carried away by the liquid nitrogen flow in the trough; and
    coupling the loading vessel to a loading cell configured to determine a load on the loading vessel.

5. The method of claim 4, further comprising controlling a volume of the ice cream premix in the loading vessel based on the measured load.

6. The method of claim 1, further comprising maintaining a volume of the ice cream premix in the loading vessel within a predetermined range.

7. The method of claim 6, wherein the range is between about 50% to 80% of the volume of the loading vessel.

8. A method of forming frozen ice cream pellets, comprising:
    supplying unfrozen ice cream premix into a loading vessel, the loading vessel having a bottom wall connecting to a plurality of loading cylinders, the bottom wall having a plurality of holes each one of which fluidly communicates with an associated one of the loading cylinders;
    allowing the ice cream premix to flow down from the loading vessel into at least top portions of the loading cylinders; and
    increasing a pressure within the loading vessel by injecting pressurized gas into a headspace of the loading vessel over the ice cream premix contained therein so as to force at least some of the ice cream premix from the loading cylinders, the ice cream premix forced from the loading cylinders falling into a flow of liquid nitrogen in a trough to at least partially freeze the fallen ice cream premix into pellets, the at least partially frozen ice cream premix pellets being carried away by the liquid nitrogen flow in the trough.

* * * * *